(12) United States Patent
Ma

(10) Patent No.: US 11,459,737 B2
(45) Date of Patent: Oct. 4, 2022

(54) LOW-COST WATER PRODUCTION SYSTEM

(71) Applicant: Hongbin Ma, Columbia, MO (US)

(72) Inventor: Hongbin Ma, Columbia, MO (US)

(73) Assignee: THE CURATORS OF THE UNIVERSITY OF MISSOURI, Columbia, MO (US)

( * ) Notice: Subject to any disclaimer, the term of this patent is extended or adjusted under 35 U.S.C. 154(b) by 305 days.

(21) Appl. No.: 16/845,798

(22) Filed: Apr. 10, 2020

(65) Prior Publication Data

US 2020/0325659 A1 Oct. 15, 2020

Related U.S. Application Data

(60) Provisional application No. 62/833,212, filed on Apr. 12, 2019.

(51) Int. Cl.
*B01D 5/00* (2006.01)
*E03B 3/28* (2006.01)
*E03B 1/04* (2006.01)

(52) U.S. Cl.
CPC .............. *E03B 3/28* (2013.01); *B01D 5/0075* (2013.01); *E03B 1/048* (2013.01)

(58) Field of Classification Search
CPC ..................................................... E03B 3/28
USPC ..................................................... 202/185.1
See application file for complete search history.

(56) References Cited

U.S. PATENT DOCUMENTS

| | | | | |
|---|---|---|---|---|
| 4,120,172 A | * | 10/1978 | Pierce | F28D 15/0266 165/104.31 |
| 8,973,383 B2 | * | 3/2015 | Sakami | F24F 3/14 62/93 |
| 9,810,483 B2 | * | 11/2017 | Bilski | F28D 15/0275 |
| 10,080,316 B2 | * | 9/2018 | Dunn | G02F 1/133385 |
| 10,101,059 B2 | * | 10/2018 | Ma | F25B 15/02 |
| 10,693,201 B2 | * | 6/2020 | Smoot | H01M 50/502 |
| 10,712,099 B2 | * | 7/2020 | Hoshino | F28D 15/06 |
| 2006/0130654 A1 | * | 6/2006 | King | B01D 5/0045 95/231 |
| 2015/0060023 A1 | * | 3/2015 | Herring | F28D 15/0266 29/890.032 |
| 2015/0323261 A1 | * | 11/2015 | Tseng | F28D 15/025 165/104.22 |
| 2019/0324507 A1 | * | 10/2019 | Carbone | H05K 7/20336 |

* cited by examiner

*Primary Examiner* — Nina Bhat
(74) *Attorney, Agent, or Firm* — Sandberg Phoenix & von Gontard PC

(57) ABSTRACT

A water production system including a radiative cooling/heating unit comprising an oscillating heat pipe (OHP) heat spreader. The radiative cooling/heating unit lowers the temperature of the OHP heat spreader below the temperature of the ambient environment. The system additionally including a first OHP heat exchanger thermally connected to the OHP heat spreader such that the first OHP heat exchanger will acquire substantially the same temperature as the OHP heat spreader, a second OHP heat exchanger thermally connected to the OHP heat spreader such that the second OHP heat exchanger will acquire substantially the same temperature as the OHP heat spreader, and a rotatable OHP water absorption bed disposed in thermal contact with the radiative cooling/heating unit such that the OHP absorption bed will acquire substantially the same temperature as the OHP heat spreader.

17 Claims, 3 Drawing Sheets

LOW-COST WATER PRODUCTION SYSTEM

CROSS REFERENCES

This application claims the benefit of U.S. Provisional Application No. 62/833,212, filed on Apr. 12, 2019. The disclosure of the above application is incorporated herein by reference in its entirety.

FIELD

The present teachings relate to water production systems, more particularly to low-cost water production system that utilized radiative heating to remove moisture from ambient air.

BACKGROUND

Known freshwater production system that produce freshwater from the air or sea water are typically complex, expensive to construct, expensive to operate and expensive to maintain. Generally, freshwater production from the ambient air is much more expensive than freshwater production from sea water. Therefore, freshwater production from sea water has been first choice for those areas where the freshwater is scarce and expensive. Freshwater production from sea water, among other things, requires a desalination process to separate fresh water from seawater. Water desalination technology is well developed. Based on the separation principle and desalting process, seawater desalination technology is mainly divided into three methods: 1) heat separation, 2) membrane separation, and 3) chemical separation. Currently, the most common processes in desalination are the multi-stage flash (MSF), multiple effect distillation (MED) and reverse osmosis (RO) technology in the seawater desalination field. However, the typical cost of the freshwater production from sea water is twice or three times higher than that of tap water. Because the cost of the freshwater production from the ambient air is even more expensive than that of the freshwater production from sea water, the large scale industrial freshwater production from the ambient air does not exist.

The statements in this section merely provide background information related to the present disclosure and may not constitute prior art.

SUMMARY

The present disclosure generally provides low-cost freshwater production system that is based on innovative advancements in four related state-of-the-art technologies: 1) vapor-solid adsorption; 2) innovative radiative unit; 3) highly efficient low-cost oscillating heat pipes (OHPs); and 4) capillary condensation. As described below, utilizing the unique feature of a radiative unit, extra high thermal conductivity of oscillating heat pipes (OHPs), saturation pressure reduction of capillary condensation, and the optimized structure of zeolite material embedded with OHPs, the water production system of the present disclosure can generate a temperature reduction below the ambient temperature of the environment in which the system is disposed. This temperature reduction utilizes the thermal energy of ambient air to power the water production system. In various embodiments, the system utilizes only two fans/blowers to produce air flows through the system such that the system is very cost efficient. In various instances, the system can produce water at a cost near of the average price of known residential water production systems, and much less expensive than the freshwater production from sea water.

In various embodiments, the low-cost water production system of the present disclosure comprises the following innovations: 1) at least one radiative unit that comprises at least one flat OHP heat spreader, and is structured and operable to achieve a high transmissivity for thermal radiation from a radiative surface of the OHP heat spreader(s) that is at an ambient temperature, and an almost zero transmissivity for thermal energy from sun; 2) at least two OHP heat exchangers comprising OHPs having microstructured or nanostructured surfaces that are structured and operable to achieve an high rate of capillary condensation; and 3) at least one water adsorption bed embedded with OHPs that is structured and operable to achieve high rates of moisture capture and release.

The water production system of the present disclosure is structured and operable to readily produce a temperature difference of between ambient air and the capillary condensation surfaces of the OHP heat exchangers, which makes it possible to use the thermal energy from ambient air to power the system, and result in low-cost highly efficient water production. The cost of operation water production system of the present disclosure is much lower than known desalination processes, which make the present system useful for wide variety of applications.

This summary is provided merely for purposes of summarizing various example embodiments of the present disclosure so as to provide a basic understanding of various aspects of the teachings herein. Various embodiments, aspects, and advantages will become apparent from the following detailed description taken in conjunction with the accompanying drawings which illustrate, by way of example, the principles of the described embodiments. Accordingly, it should be understood that the description and specific examples set forth herein are intended for purposes of illustration only and are not intended to limit the scope of the present teachings.

BRIEF DESCRIPTION OF THE DRAWINGS

The drawings described herein are for illustration purposes only and are not intended to limit the scope of the present teachings in any way.

Corresponding reference numerals indicate corresponding parts throughout the several views of drawings.

DETAILED DESCRIPTION

Figure 1:
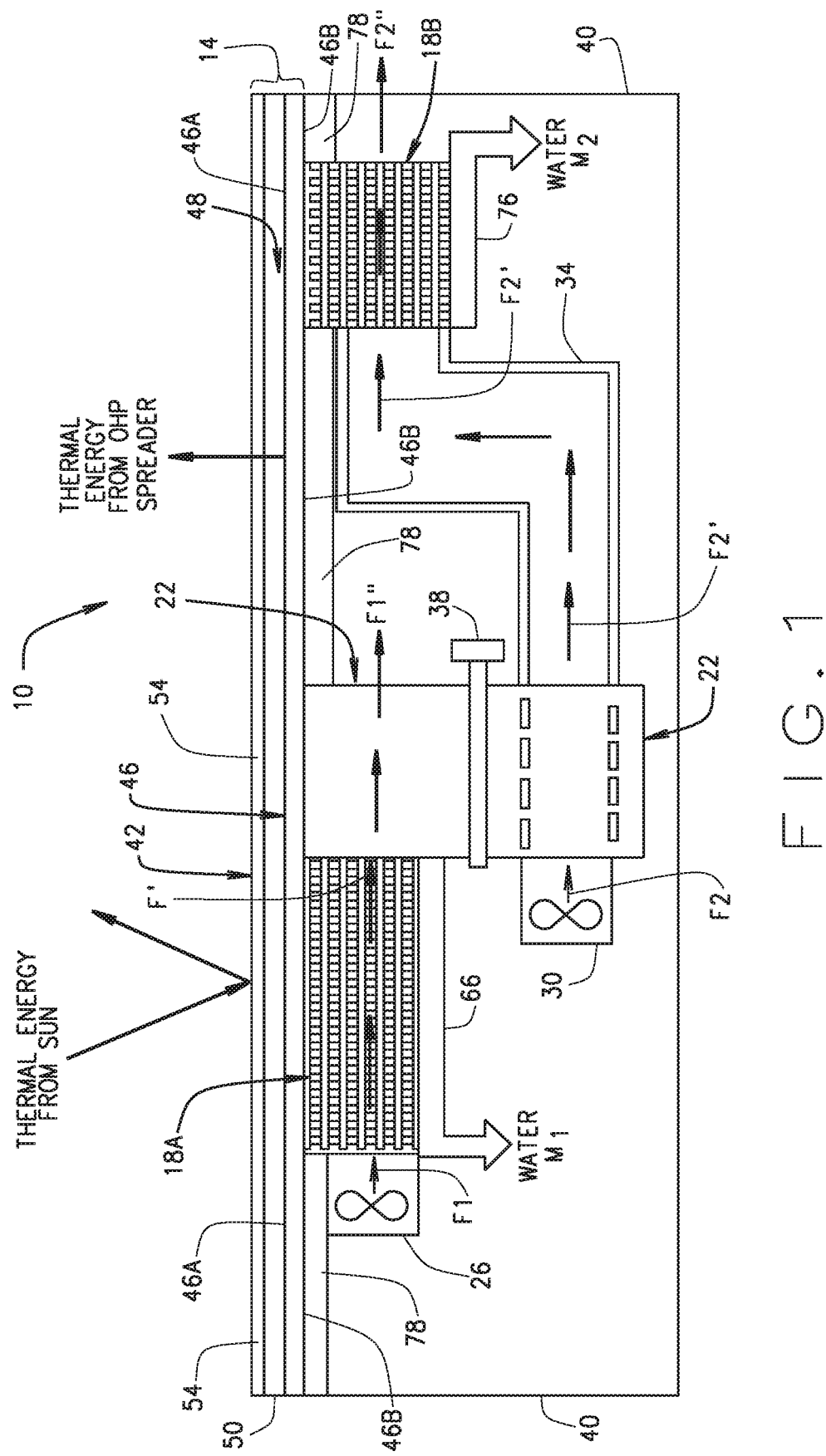
FIG. 1 is an exemplary block illustration of the low-cost water production system of the present disclosure, in accordance with various embodiments of the present disclosure.

The following description is merely exemplary in nature and is in no way intended to limit the present teachings, application, or uses. Throughout this specification, like reference numerals will be used to refer to like elements. Additionally, the embodiments disclosed below are not intended to be exhaustive or to limit the invention to the precise forms disclosed in the following detailed description. Rather, the embodiments are chosen and described so that others skilled in the art can utilize their teachings. As well, it should be understood that the drawings are intended to illustrate and plainly disclose presently envisioned embodiments to one of skill in the art, but are not intended to be manufacturing level drawings or renditions of final products and may include simplified conceptual views to facilitate understanding or explanation. As well, the relative size and arrangement of the components may differ from that shown and still operate within the spirit of the invention.

As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims.

Unless otherwise defined, all technical and scientific terms used herein have the same meaning as commonly understood by one of ordinary skill in the art to which this disclosure belongs. The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps can be employed.

When an element, object, device, apparatus, component, region or section, etc., is referred to as being "on," "engaged to or with," "connected to or with," or "coupled to or with" another element, object, device, apparatus, component, region or section, etc., it can be directly on, engaged, connected or coupled to or with the other element, object, device, apparatus, component, region or section, etc., or intervening elements, objects, devices, apparatuses, components, regions or sections, etc., can be present. In contrast, when an element, object, device, apparatus, component, region or section, etc., is referred to as being "directly on," "directly engaged to," "directly connected to," or "directly coupled to" another element, object, device, apparatus, component, region or section, etc., there may be no intervening elements, objects, devices, apparatuses, components, regions or sections, etc., present. Other words used to describe the relationship between elements, objects, devices, apparatuses, components, regions or sections, etc., should be interpreted in a like fashion (e.g., "between" versus "directly between," "adjacent" versus "directly adjacent," etc.).

As used herein, the term "and/or" includes any and all combinations of one or more of the associated listed items. For example, A and/or B includes A alone, or B alone, or both A and B.

Although the terms first, second, third, etc. can be used herein to describe various elements, objects, devices, apparatuses, components, regions or sections, etc., these elements, objects, devices, apparatuses, components, regions or sections, etc., should not be limited by these terms. These terms may be used only to distinguish one element, object, device, apparatus, component, region or section, etc., from another element, object, device, apparatus, component, region or section, etc., and do not necessarily imply a sequence or order unless clearly indicated by the context.

Moreover, it will be understood that various directions such as "upper", "lower", "bottom", "top", "left", "right", "first", "second" and so forth are made only with respect to explanation in conjunction with the drawings, and that components may be oriented differently, for instance, during transportation and manufacturing as well as operation. Because many varying and different embodiments may be made within the scope of the concept(s) herein taught, and because many modifications may be made in the embodiments described herein, it is to be understood that the details herein are to be interpreted as illustrative and non-limiting.

Referring now to FIG. 1, the present disclosure provides a low-cost water production system 10 that is structured and operable to be disposed outdoors and utilize radiative cooling and the high thermal conductivity of oscillating heat pipes (OHPs) to remove moisture from ambient air, thereby very cost efficiently producing water. The system 10 generally comprises: at least one radiative cooling/heating unit 14; at least one first OHP heat exchanger 18A thermally connected to the radiative cooling/heating unit(s) 14; at least one second OHP heat exchanger 18B thermally connected to the radiative cooling/heating unit(s) 14; a rotatable water absorption bed 22 disposed in thermal contact with the radiative cooling/heating unit(s) 14; at least one exchanger fan 26 disposed adjacent to and in fluid communication with the first OHP heat exchanger(s) 18A; at least one bed fan 30 disposed adjacent to the rotatable water absorption bed 22, and in fluid communication with the rotatable water absorption bed 22 and the second OHP heat exchanger(s) 18B; an air duct fluidly connecting the rotatable water absorption bed 22 with the second OHP heat exchangers 18B; and motor 38 structured and operable to rotate the rotatable water absorption bed 22. The system 10 additionally comprises a frame or chassis 40 that is structured and operable to support and/or have connected thereto each of the above components 14 through 38.

In various embodiments, each of the at least one radiative cooling/heating units 14 comprise a top radiative panel 42, at least one flat OHP heat spreader 46 that is spaced apart from the radiative panel 42 and provides a bottom face of the respective radiative cooling/heating unit 14, and four sides 50 that form a vacuum sealed enclosure such that there is a layer of vacuum insulation 48 provided between the radiative panel 42 and a top surface 46A of the OHP heat spreader 46 that reduce the convection heat loss from the OHP heat spreader. The term 'OHP' in OHP heat spreader 46 should be understood to mean that the OHP heat spreader 46 comprises a plurality of oscillating heat pipes that are well known to very efficiently and quickly transfer heat from one location to another. Hence, in various embodiments, the flat OHP heat spreader(s) 46 comprise a flat panel having one or more (e.g., a plurality) of OHPs formed or embedded within, or otherwise internally disposed therein.

The top radiative panel 42 comprises a radiative film 54 that is structured and operable to block and reflect thermal energy having short wavelengths (e.g., thermal energy having wavelengths of 0.2 µm to 0.3 µm), such as thermal energy from the sun, and will not block (i.e., allow to pass therethrough) thermal energy having long wavelengths (e.g., thermal energy having wavelengths of 6 µm to 54 µm), such as thermal energy radiated from the top surface 46A of the OHP heat spreader 46. More particularly, the wavelength of thermal energy (radiation) emitted from a surface depends on the surface temperature. When the surface temperature is higher, most of the thermal energy (radiation) emitted from a surface is by shorter wavelengths. For example, the thermal energy emitted by the sun is typically at a temperature of approximately 5778° K (9922.7° F.) and will emit over 98% of the thermal energy at typical wavelengths ranging from 0.2-3.0 µm. Conversely, when the ambient temperature at the earth's surface is about 300° K (80.3° F.), 95% of the thermal energy (radiation) emitted at this temperature has the wavelength ranging from 6-50 µm.

The radiative film 54 has physical properties that block the thermal radiation at wavelengths of 0.2-3.0 µm and will not block the thermal energy (radiation) at the wavelengths from 6-50 µm. Furthermore, because the temperature in space (above the earth's atmosphere) is typically about −459.7° F. (0° K), radiation heat transfer takes place between the surface of the OHP spreader 46 (beneath/behind the radiative panel and film 42 and 54) and space. As a result, the surface temperature of the OHP spreader 46 will decrease to a temperature less than the ambient temperature in which the system 10 is disposed. Hence, when the system 10 is placed outdoors having the radiative cooling/heating unit(s) 14 disposed with the top radiative panel 42 facing skyward, the radiative film 54 will block and reflect the thermal energy from the sun (e.g., approximately 0% transmissivity of thermal energy) and allow the thermal energy radiated from the top surface 46A to pass therethrough (e.g., approximately 100% transmissivity of thermal energy), thereby extracting thermal energy (i.e., heat) from the flat OHP spreader 46. Moreover, due to the high thermal conductivity of the OHPs of the OHP heat spreader 46, the entire OHP heat spreader 46 will uniformly achieve a temperature of 10° F. to 40° F., or more, below the ambient temperature of the environment in which the system 10 is disposed. For example, if ambient temperature is 30° C. (89° F.), the radiative surface of the OHP heat spreader(s) 46 can achieve a temperature of approximately 20° C. (68° F.). The layer of vacuum insulation 48 prevents or significantly reduces thermal energy from the ambient environment that passes through the radiative film 54 from heating the top surface 46A of the OHP heat spreader 46. Additionally, as describe below, a layer of insulation can be disposed over the bottom surface 46B of the OHP heat spreader 46 to prevent or significantly reduce thermal energy from the ambient environment from heating the bottom surface of the top surface 46A.

The radiative film 54 can be any suitable film that comprises the properties described above regarding reflecting short wavelength thermal energy and letting longer wavelength thermal energy pass therethrough. For example, in various embodiments, the radiative film 54 can comprise micrometer sized $SiO_2$ beads disposed in a polymer matrix and a silver reflective layer. The radiative panel 42 can comprise any suitable clear and transparent material such as glass or plexiglass. In various embodiments, to emissivity of the top surface 46A of the OHP heat spreader 46 on the OHP spreader 46, the top surface 46A can be coated with any suitable substance that will increase the emissivity, such as a dark coating, for example black paint.

Figure 2A:
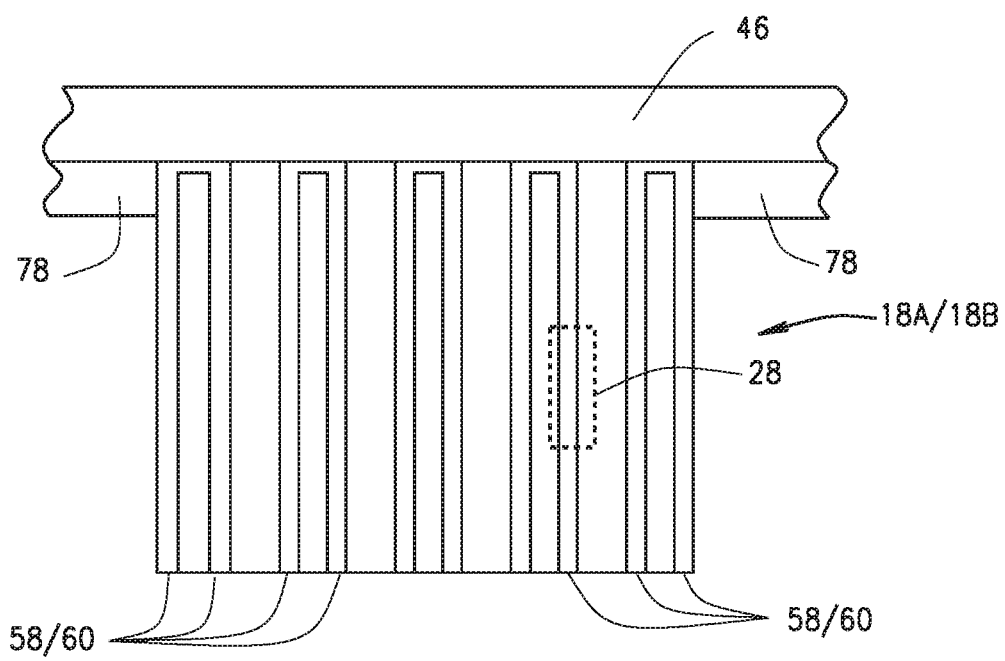
FIG. 2A is an exemplary illustration of an oscillating heat pipe heat exchanger of the system shown in FIG. 1, in accordance with various embodiments of the present disclosure.
Figure 2B:
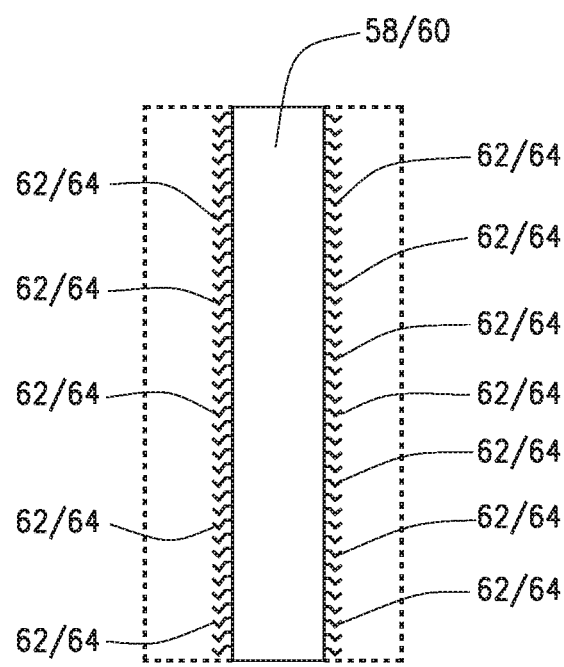
FIG. 2B is an exemplary amplified illustration of a section of the oscillating heat pipe heat exchanger shown in FIG. 2A illustrating microstructures and/or nanostructures disposed or formed on the surfaces of panels of the oscillating heat pipe heat exchanger shown in FIG. 2A, in accordance with various embodiments of the present disclosure.

Referring now to FIGS. 1, 2A and 2B, as described above, in various embodiments, the system 10 further comprises the first and second OHP heat exchangers 18A and 18B thermally connected to the radiative cooling/heating unit(s) 14. The system is exemplarily illustrated having a single first OHP heat exchanger 18A and a single second OHP heat exchanger 18B, but in various embodiments can in include more than two OHP heat exchangers 18A and 18B More particularly, each of the first and second OHP heat exchangers 18A and 18B are in direct physical contact with, or connected to, the bottom surface 46B of the OHP heat spreader(s) 46, such that thermal energy from the OHP spreader(s) 46 is transferred directly to the first and second OHP heat exchangers 18A and 18B. Each of the first and second OHP heat exchangers 18A and 18B respectively comprise a plurality of first OHP panels 58 and second OHP panels 60 having one or more (e.g., a plurality) of OHPs formed or embedded within, or otherwise internally disposed therein. Accordingly, due to the high thermal conductivity of the OHPs of each first and second OHP panel 58 and 60 of the first and second OHP heat exchangers 18A and 18B, each entire first and second OHP exchangers 18A and 18B will uniformly achieve approximately the same temperature of the OHP heat spreader(s) 46, e.g., approximately 10°-40° below the ambient temperature of the environment in which the system 10 is disposed. As described further below, one or more surface of each first OHP panel 58 and each second OHP panel 60 respectively comprise first capillary microstructures and/or nanostructures 62 and second capillary microstructures and/or nanostructures 64 (shown in FIG. 2B) formed or disposed on the surface(s) thereof. The first and second capillary microstructures and/or nanostructures 62 and 64 are structured and operable to achieve a high rate of capillary condensation. That is, one or more surface of each OHP panel 58 and 60 of the first and second OHP heat exchangers 18A and 18B is covered with, fabricated to comprise, or otherwise comprises the first and second capillary microstructures or nanostructures 62 and 64 that are structured and operable to achieve a high rate of capillary condensation, as described below.

As described above, the exchanger fan(s) 26 is/are disposed adjacent to and in fluid communication with the first OHP heat exchanger 18A. More particularly, the exchanger fan(s) 26 is/are structured and operable to generate and blow a first ambient air flow F1 (i.e., an air flow initially having a temperature substantially equal to the temperature of the ambient environment in which the system 10 is disposed) through the first OHP heat exchanger 18A (i.e., between and across the surfaces of the first OHP panels 58) at a flow rate of $Q_1$. As described further below, due to the low temperature of the first OHP heat exchanger 18A resulting from the physical and thermal contact of the first OHP heat exchanger 18A with the OHP heat spreader(s) 46 (e.g., a temperature of 10°-40° below the ambient temperature of the environment in which the system 10 is disposed), the moisture in the first ambient air flow F1 will be extracted and form water on the surfaces of the first OHP panels 58 of the first OHP heat exchanger 18A. Moreover, the capillary micro/nano structures 62 on the surfaces of the first OHP panels 58 will stimulate capillary condensation thereby extracting a high percentage of the moisture from the first ambient air flow F1 as it passed between and over the first OHP panels 58. Particularly, the capillary micro/nano structures 62 on the surfaces of the first OHP panels 58 of the first heat exchanger 18A will reduce the saturation pressure of the first ambient air flow F1 and thereby increase the relative humidity of the first ambient air flow F1 first exchanger 18A, and thereby increase the amount of water that will form or collect on the surfaces of the first OHP heat exchanger panels 58, resulting in water production at a mass flow rate of $M_1$. The water extracted $M_1$ from the first ambient air flow F1 will fall, via gravity, to a first collection tray 66 disposed beneath the first OHP heat exchanger 18A, whereafter the water can be diverted to any desired collection device.

Figure 3:
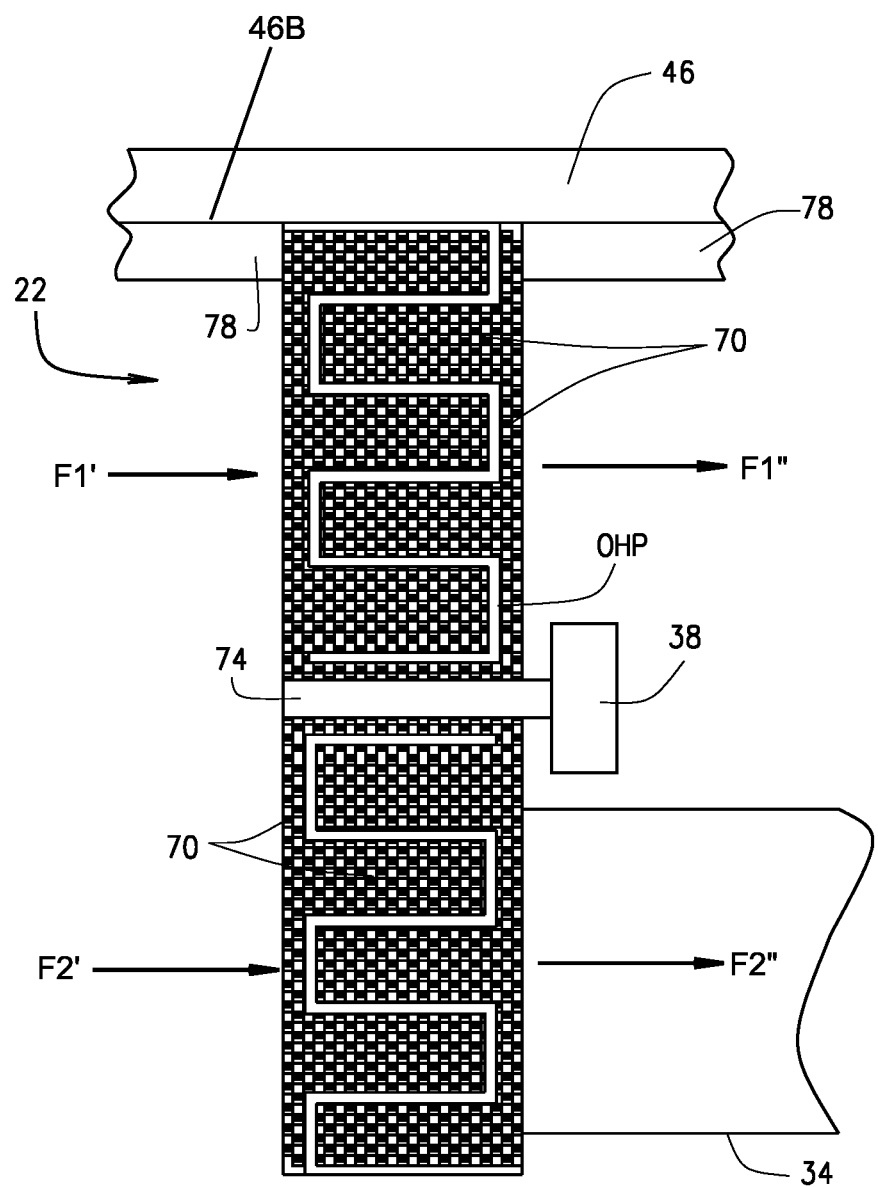
FIG. 3 is an exemplary illustration of a rotatable water absorption bed of the system shown in Figure, in accordance with various embodiments of the present disclosure.

Referring now to FIGS. 1 and 3, as described above the system 10 comprises the rotatable water absorption bed 22 disposed in thermal contact with the radiative cooling/heating unit(s) 14. More specifically, the absorption bed 22 is in physical and/or thermal contact with the OHP heat spreader bottom surface 46B. Additionally, the absorption bed 22 is disposed and positioned such that a portion above an axle 74 is in very close proximity to an exit end of the first OHP heat exchanger 18A and the path of the first ambient air flow F1 as the first ambient air flow F1 exits the first OHP heat exchanger 18A. The absorption bed 22 comprises a plurality of OHPs disposed within an annular or discus shaped body 70 constructed of a Zeolite microporous material. The OHPs are disposed within the Zeolite body 70 such that, depending on the rotational position of the absorption bed 22, selected OHPs are in physical and/or thermal contact with the OHP heat spreader bottom surface 46B. The OHPs of the absorption bed 22 extend radially from the outer periphery of the absorption bed 22 to or near an axle 74 of the absorption bed 22, and can extend laterally from radii of the absorption bed 22 in various directions within designated sections of the absorption bed 22, such that each respective designated section will be maintained at a respective temperature substantially equivalent or near to that of the OHPs within the respective designated section.

Accordingly, the designated section of the absorption bed 22 having the respective OHPs physically and/or thermally contacting the OHP heat spreader 46 will quickly decrease in temperature and achieve a temperature substantially equal to that of the OHP heat spreader (e.g., approximately 10° F. to 40° F., or more, below the ambient temperature of the environment in which the system 10 is disposed). Consequently, as the absorption bed 22 is rotated about the axle 74, via the motor 38, the designated section being removed from physical and/or thermal contact with the OHP heat spreader 46 will begin to contact and warm to the ambient temperature from the fan 30, and the designated section being placed in physical and/or thermal contact with the OHP heat spreader 46 will begin to cool to the OHP heat spreader temperature (e.g., approximately 10° F. to 40° F., or more, below the ambient temperature of the environment in which the system 10 is disposed). Moreover, the absorption bed 22 is disposed adjacent the exit end of the first OHP heat exchanger 18A such that the respective section of the absorption bed 22 that is in physical and/or thermal contact with the OHP heat spreader 46 will be aligned with the exit end of the of the first OHP heat exchanger 18A such that a first exchanger exit air flow F1' exiting the first OHP heat exchanger 18A will flow through the respective cooled section of the absorption bed 22.

As the first ambient air flow F1 passes through the first OHP heat exchanger 18A only a portion of the moisture therein (e.g., approximately 50% to 80%) will condense and be extracted as described above, leaving a portion of the moisture (e.g., 20% to 50%) remaining in the first exchanger exit air flow F1' exiting the first OHP heat exchanger 18A. The first exchanger exit air flow F1' will then pass through the cooled designated section of OHP absorption bed 22 (i.e., the designated section of the OHP absorption bed having the OHPs in physical and/or thermal contact with the OHP heat spreader 46). Since the OHP absorption bed cooled designated section, (i.e., Zeolite of the cooled designated section) is at a temperature approximately 10° F. to 40° F., or more, below the ambient temperature of the environment in which the system 10 is disposed, the Zeolite will absorb approximately 70% to 90% of the moisture remaining in the first exchanger exit air flow F1' exiting the first OHP heat exchanger 18A, such that the absorption bed exit air flow F1' exiting the cooled designated section of the OHP absorption bed 22 will have very little moisture remaining, the majority (e.g., 70% to 90%) of the moisture in the first exchanger exit air flow F1' be extracted and absorbed by the Zeolite in the cooled designated section of the absorption bed 22.

The absorption bed 22 controllably rotates as controlled by a computer-based control system (not shown) of the system 10. In various embodiments, the absorption bed 22 can rotate at a consistent speed, while in other embodiments the absorption bed 22 can rotate a certain distance (e.g., 90° or 180°) at specified intervals (e.g., every 5 seconds, or every 10 seconds, or every 30 second, etc.). After the cooled designated section of the absorption bed 22 (exemplarily referred to as designated section C1) is rotated out of physical and/or thermal contact with the OHP heat spreader 46, and away from the exchanger exit flow F1', that section C1 will begin to warm. Moreover, in various embodiments, after the Zeolite in the cooled section C1 is exposed to the first exchanger exit air flow F1' for a designated period time (e.g., a time period estimated to allow the Zeolite of section C1 to reach a desired saturation level) the absorption bed 22 will be rotated (gradually or a designated distance) to position the section C1 between the bed fan(s) 30 and an inlet 34A of the air duct 34. Consequently, another designated section of the absorption bed (exemplarily referred to as C2) will be positioned adjacent the exit end of the first OHP heat exchanger, whereby the OHPs within the designated section C2 will cool the Zeolite of the designated section C2 such that the respective Zeolite will absorb the moisture in the first exchanger exit air flow F1', as described above.

Further consequently, the bed fan(s) 30 will generate and blow a second ambient air flow F2 (i.e., an air flow initially having a temperature substantially equal to the temperature of the ambient environment in which the system 10 is disposed) at a flow rate of Q2 through Zeolite of designated section C1 of the absorption bed 22 having the moisture from the first exchanger exit air flow F1' absorbed therein. As described above, the Zeolite of the designated section C1 warms as it is rotated out of physical and/or thermal contact with the OHP heat spreader 47, and away from the exchanger exit flow F1'. Additionally, the second ambient air flow F2 will warm the Zeolite in the designated section C1. As also described above, as the temperature of the Zeolite increases, it will begin to release the moisture absorbed therein. Hence, as the second ambient air flow F2 passes through the Zeolite of designated section C1, the Zeolite will release the absorbed moisture into the second ambient air flow F2. Particularly, the moisture released from the Zeolite of designated section C1 will vaporize into the second ambient air flow F2 such that a bed exit air flow F2' exiting the designated section C1 of the absorption bed 22 will comprise the moisture removed from the exchanger exit air flow F1'. Accordingly, the relative humidity of the bed exit air flow F2' is higher or greater than the relative humidity of the ambient air flow F2. The bed exit air flow F2', having the increased relative humidity, will flow through the air duct 34 and be directed by the air duct 34 into the second OHP heat exchanger 18B.

Referring again to FIGS. 1, 2A and 2B, as described above, the second OHP heat exchanger 18B is in direct physical contact with, or connected to, the bottom surface 46B of the OHP heat spreader(s) 46, such that thermal energy from the OHP spreader(s) 46 is transferred directly to the second OHP heat exchanger 18B. Additionally, the OHP heat exchanger 18B comprises a plurality of OHP panels 60 having one or more (e.g., a plurality) of OHPs formed or embedded within, or otherwise internally disposed therein. Accordingly, due to the high thermal conductivity of the OHPs of each OHP panel 60 of the second OHP heat exchanger 18B, the second OHP exchanger 18B will uniformly achieve approximately the same temperature of the OHP heat spreader(s) 46, e.g., approximately 10°-40° below the ambient temperature of the environment in which the system 10 is disposed. Additionally, as described above, one or more surface of each OHP panel 60 comprises capillary microstructures and/or nanostructures 64 that are structured and operable to achieve a high rate of capillary condensation.

As described above, the bed fan(s) 30 is/are in fluid communication with the second OHP heat exchanger 18B, via the duct 34. Hence, the bed fan(s) 30 will blow the bed exit air flow F2' through the second OHP heat exchanger 18B. Due to the low temperature of the second OHP heat exchanger 18B resulting from the physical and thermal contact with the OHP heat spreader(s) 46 (e.g., a temperature of 10°-40° below the ambient temperature of the environment in which the system 10 is disposed), the moisture in the bed exit air flow F2' will be extracted and form water on the surfaces of the second OHP panels 60 of the second OHP heat exchanger 18B. Moreover, the capillary micro/nano structures 64 on the surfaces of the second OHP panels 60 will stimulate capillary condensation thereby extracting a high percentage of the moisture from the bed exit air flow F2' as it passed between and over the second OHP panels 60. Particularly, the capillary micro/nano structures 64 on the surfaces of the second OHP panels 60 of the second heat exchanger 18B will reduce the saturation pressure of the bed exit air flow F2' and thereby increase the relative humidity of the bed exit air flow F2' flowing through the second exchanger 18B, and thereby increase the amount of water that will form or collect on the surfaces of the second OHP heat exchanger panels 60, resulting in water production at a mass flow rate of $M_2$. The water extracted $M_2$ from the bed exit air flow F2' will fall, via gravity, to a collection tray 76 disposed beneath the second OHP heat exchanger 18B, whereafter the water can be diverted to any desired collection device. Thereafter, a second heat exchanger exit air flow F2" will exit the second OHP heat exchanger 18B into the ambient environment.

Referring to FIG. 1, if left uninsulated, when the temperature of the OHP heat spreader bottom surface 46B is below the temperature of ambient environment in which the system 10 is disposed (as a result of the radiative heating described above) thermal energy can be transferred from the ambient air to the OHP heat spreader 46 by convection and conduction heat transfer. To prevent or reduce such heat transfer, and in order to further reduce the surface temperature of the OHP heat spreader 46, and hence the temperature of the first and second OHP heat exchangers 18A and 18B and the OHP absorption bed 22, in various embodiments a layer of insulation 78 can be disposed across the OHP heat spreader bottom surface 46B. The insulation layer 78 can comprise any suitable transparent or nontransparent type or form of insulation. For example, in various embodiments, a vacuum enclosure can be disposed across the areas of bottom surface 46B that are exposed to the ambient environment, i.e., the areas of the bottom surface that are not in physical and/or thermal contact with the first and second OHP heat exchangers 18A and 18B and the OHP absorption bed 22. Alternatively, other insulative materials can be used to reduce the heat transfer between the OHP heat spreader bottom surface 46B and the ambient air. Alternatively, other insulative materials can be used to reduce the heat transfer between the OHP heat spreader bottom surface 46B and the ambient air.

The water production system 10 of the present disclosure can generate a total water production rate of $M_1+M_2$. Based on the energy balance from the radiation heat transfer and latent heat of water vapor condensation, in various instances it is envisioned that the radiative cooling/heating unit(s) 18 having an area of 10 m×10 m for radiative cooling can produce about 1,100 kg of fresh water per day. Based on a relative humidity of 50%, the operation of the exchanger fan(s) 26 and bed fan(s) 30, it is envisioned that the electricity cost to power the system 10 can be less than $0.40 per day to produce 1,100 kg of water. This is about 30-40% of the average known residential water price.

The description herein is merely exemplary in nature and, thus, variations that do not depart from the gist of that which is described are intended to be within the scope of the teachings. Moreover, although the foregoing descriptions and the associated drawings describe example embodiments in the context of certain example combinations of elements and/or functions, it should be appreciated that different combinations of elements and/or functions can be provided by alternative embodiments without departing from the scope of the disclosure. Such variations and alternative combinations of elements and/or functions are not to be regarded as a departure from the spirit and scope of the teachings.

What is claimed is:
1. A water production system, said system comprising:
a radiative cooling/heating unit comprising an oscillating heat pipe (OHP) heat spreader, the radiative cooling/heating unit operable to lower the temperature of the OHP heat spreader to a temperature below the temperature of the ambient environment in which the water production system is disposed;
a first oscillating heat pipe (OHP) heat exchanger thermally connected to the OHP heat spreader such that the first OHP heat exchanger will acquire substantially the same temperature as the OHP heat spreader, the first OHP heat exchanger operable to remove moisture from a first air flow flowing through the first OHP heat exchanger;
a second oscillating heat pipe (OHP) heat exchanger thermally connected to the OHP heat spreader such that the second OHP heat exchanger will acquire substantially the same temperature as the OHP heat spreader, the second OHP heat exchanger operable to remove moisture from a second air flow flowing through the first OHP heat exchanger; and
a rotatable oscillating heat pipe (OHP) water absorption bed disposed in thermal contact with the radiative cooling/heating unit such that the OHP absorption bed will acquire substantially the same temperature as the OHP heat spreader, wherein the system is operable to collect the moisture removed from the first and second air flows in the form of water.

2. The system of claim 1 further comprising an exchanger fan disposed adjacent to and in fluid communication with the first OHP heat exchanger, the exchanger fan operable to generate the first air flow and blow the first air flow through the first OHP heat exchanger.

3. The system of claim 2, wherein the first OHP heat exchanger comprises a plurality of first oscillating heat pipe (OHP) panels having a plurality of first capillary structures disposed on the surfaces of the first OHP panels, the first capillary structures operable to remove moisture from the first air flow via capillary condensation.

4. The system of claim 3 further comprising a first water collection tray operable to receive condensation removed from the first air flow by the first OHP heat exchanger.

5. The system of claim 3, wherein the OHP water absorption bed comprises a body including a Zeolite material and having a plurality of oscillating heat pipes disposed therein, wherein the OHP water absorption bed is disposed adjacent an exit end of the first OHP heat exchanger such that the first air flow exiting the first OHP heat exchanger will pass through the OHP water absorption bed, the OHP water absorption bed operable to extract and collect moisture from the first air flow exiting the first OHP heat exchanger.

6. The system of claim 5 further comprising a bed fan disposed adjacent to, and in fluid communication with, the OHP water absorption bed, the bed fan operable to generate the second air flow and blow the second air flow through the OHP water absorption bed such that the moisture extracted and collected from the first air flow exiting the first OHP heat exchanger is released from OHP water absorption bed into the second air flow, whereby the relative humidity of the second air flow exiting the OHP water absorption bed is higher than the relative humidity of the second air flow entering the OHP water absorption bed.

7. The system of claim 6, wherein the bed fan is further operable to blow the second air flow exiting the OHP water absorption bed through the second OHP heat exchanger.

8. The system of claim 7, wherein the second OHP heat exchanger comprises a plurality of second oscillating heat pipe (OHP) panels having a plurality of second capillary structures disposed on the surfaces of the second OHP panels, the second capillary structures and operable to remove moisture from the second air flow exiting the OHP water absorption bed via capillary condensation.

9. The system of claim 8 further comprising a second water collection tray operable to receive condensation removed from second air flow exiting the OHP water absorption bed by the second OHP heat exchanger.

10. A water production system, said system comprising:
a radiative cooling/heating unit comprising an oscillating heat pipe (OHP) heat spreader, the radiative cooling/heating unit operable to lower the temperature of the OHP heat spreader to a temperature below the temperature of the ambient environment in which the water production system is disposed;
a first oscillating heat pipe (OHP) heat exchanger thermally connected to the OHP heat spreader such that the first OHP heat exchanger will acquire substantially the same temperature as the OHP heat spreader, first OHP heat exchanger comprising a plurality of first oscillating heat pipe (OHP) panels having a plurality of first capillary structures disposed on the surfaces of the first OHP panels, the first capillary structures operable to remove moisture from a first air flow blown through the first OHP heat exchanger via capillary condensation;
a rotatable oscillating heat pipe (OHP) water absorption bed disposed in thermal contact with the radiative cooling/heating unit such that the OHP absorption bed will acquire substantially the same temperature as the OHP heat spreader, the OHP water absorption bed comprising a body including a Zeolite material and having a plurality of oscillating heat pipes disposed therein, wherein the OHP water absorption bed is disposed adjacent an exit end of the first OHP heat exchanger such that the first air flow exiting the first OHP heat exchanger will pass through the OHP water absorption bed, the OHP water absorption bed operable to extract and collect moisture from the first air flow exiting the first OHP heat exchanger; and
a second oscillating heat pipe (OHP) heat exchanger thermally connected to the OHP heat spreader such that the second OHP heat exchanger will acquire substantially the same temperature as the OHP heat spreader, the second OHP heat exchanger comprising a plurality of second oscillating heat pipe (OHP) panels having a plurality of second capillary structures disposed on the surfaces of the second OHP panels, the second capillary structures operable to remove moisture from a second air flow exiting the OHP water absorption bed and blown through the second OHP heat exchanger via capillary condensation,
wherein the system is operable to collect the moisture removed from the first and second air flows in the form of water.

11. The system of claim 10 further comprising an exchanger fan disposed adjacent to and in fluid communication with the first OHP heat exchanger, the exchanger fan operable to generate the first air flow and blow the first air flow through the first OHP heat exchanger.

12. The system of claim 11 further comprising a bed fan disposed adjacent to, and in fluid communication with, the OHP water absorption bed, the bed fan operable to generate the second air flow and blow the second air flow through the OHP water absorption bed such that the moisture extracted and collected from the first air flow exiting the first OHP heat exchanger is released from OHP water absorption bed into the second air flow, whereby the relative humidity of the second air flow exiting the OHP water absorption bed is higher than the relative humidity of the second air flow entering the OHP water absorption bed.

13. The system of claim 12, wherein the bed fan is further operable to blow the second air flow exiting the OHP water absorption bed through the second OHP heat exchanger.

14. A method for producing water, said method comprising:
lowering the temperature of an oscillating heat pipe (OHP) heat spreader of a radiative cooling/heating unit of a water production system to a temperature below the temperature of the ambient environment in which the water production system is disposed utilizing radiative heat reduction;
removing water via capillary condensation from a first air flow by blowing the first air flow through a first oscillating heat pipe (OHP) heat exchanger thermally connected to the OHP heat spreader such that the first OHP heat exchanger will acquire substantially the same temperature as the OHP heat spreader, wherein the first OHP heat exchanger comprises a plurality of first oscillating heat pipe (OHP) panels having a plurality of first capillary structures disposed on the surfaces of the first OHP panels that induce capillary condensation;

extracting and retaining moisture from the first air flow exiting the first OHP heat exchanger by blowing the first air flow exiting the first OHP heat exchanger through a rotatable oscillating heat pipe (OHP) water absorption bed of the water production system, the OHP water absorption bed disposed in thermal contact with the radiative cooling/heating unit such that a section of the OHP absorption bed will acquire substantially the same temperature as the OHP heat spreader, wherein the water absorption bed comprises a body including a Zeolite material and a plurality of oscillating heat pipes disposed therein, wherein the Zeolite material of the body extracts and retains the moisture from the first air flow exiting the first OHP heat exchanger;

releasing the moisture extracted and retained by the OHP water absorption bed into a second air flow by blowing the second air flow through the OHP water absorption bed whereby the Zeolite material of the body releases the extracted and retained water into the second air flow, thereby increasing the relative humidity of the second air flow exiting the OHP water absorption bed;

removing water via capillary condensation from a second air flow by blowing the second air flow through a second oscillating heat pipe (OHP) heat exchanger thermally connected to the OHP heat spreader such that the second OHP heat exchanger will acquire substantially the same temperature as the OHP heat spreader, wherein the second OHP heat exchanger comprises a plurality of second oscillating heat pipe (OHP) panels having a plurality of second capillary structures disposed on the surfaces of the second OHP panels that induce capillary condensation' and collecting the water removed from the first and second air flows.

15. The method of claim 14 further comprising generating the first air flow and blowing the first air flow through the first OHP heat exchanger utilizing an exchanger fan of the water production system that is disposed adjacent to and in fluid communication with the first OHP heat exchanger.

16. The method of claim 15 further comprising generating the second air flow and blowing the second air flow through the OHP water absorption bed utilizing a bed fan of the water production system that is disposed adjacent to, and in fluid communication with, the OHP water absorption bed.

17. The method of claim 16 further comprising blowing the second air flow exiting the OHP water absorption bed through the second OHP heat exchanger utilizing the bed fan.

* * * * *